United States Patent [19]

Thorsness

[11] 4,454,901
[45] Jun. 19, 1984

[54] MULTI-DIRECTIONAL ROTARY SAW

[76] Inventor: Wilfred Thorsness, 5518 N. Market, Spokane, Wash. 99207

[21] Appl. No.: 176,481

[22] Filed: Aug. 8, 1980

Related U.S. Application Data

[63] Continuation-in-part of Ser. No. 954,651, Apr. 2, 1979, abandoned.

[51] Int. Cl.³ .................................... B27G 13/00
[52] U.S. Cl. .................................... 144/218; 83/854;
83/847; 56/295; 144/240
[58] Field of Search .................. 144/218, 240, 241;
83/835, 836, 839, 847, 848, 850, 855, 837, 840,
838, 841, 842–846, 851–854; 407/113, 114;
56/295

[56] References Cited

U.S. PATENT DOCUMENTS 4,090,346  5/1978  Doi .................................... 56/295

FOREIGN PATENT DOCUMENTS

| 172082 | 6/1905 | Austria ........................... 144/218 |
| 887701 | 7/1953 | Fed. Rep. of Germany ........ 83/849 |
| 2365276 | 5/1978 | France ............................ 407/113 |
| 2450152 | 10/1980 | France ........................... 144/218 |
| 5881 | of 1890 | United Kingdom ............. 83/854 |

*Primary Examiner*—W. D. Bray

[57] ABSTRACT

A substantially triangular-shaped multi-directional rotary saw blade suitable for arcuate and plunge cutting is disclosed.

7 Claims, 6 Drawing Figures

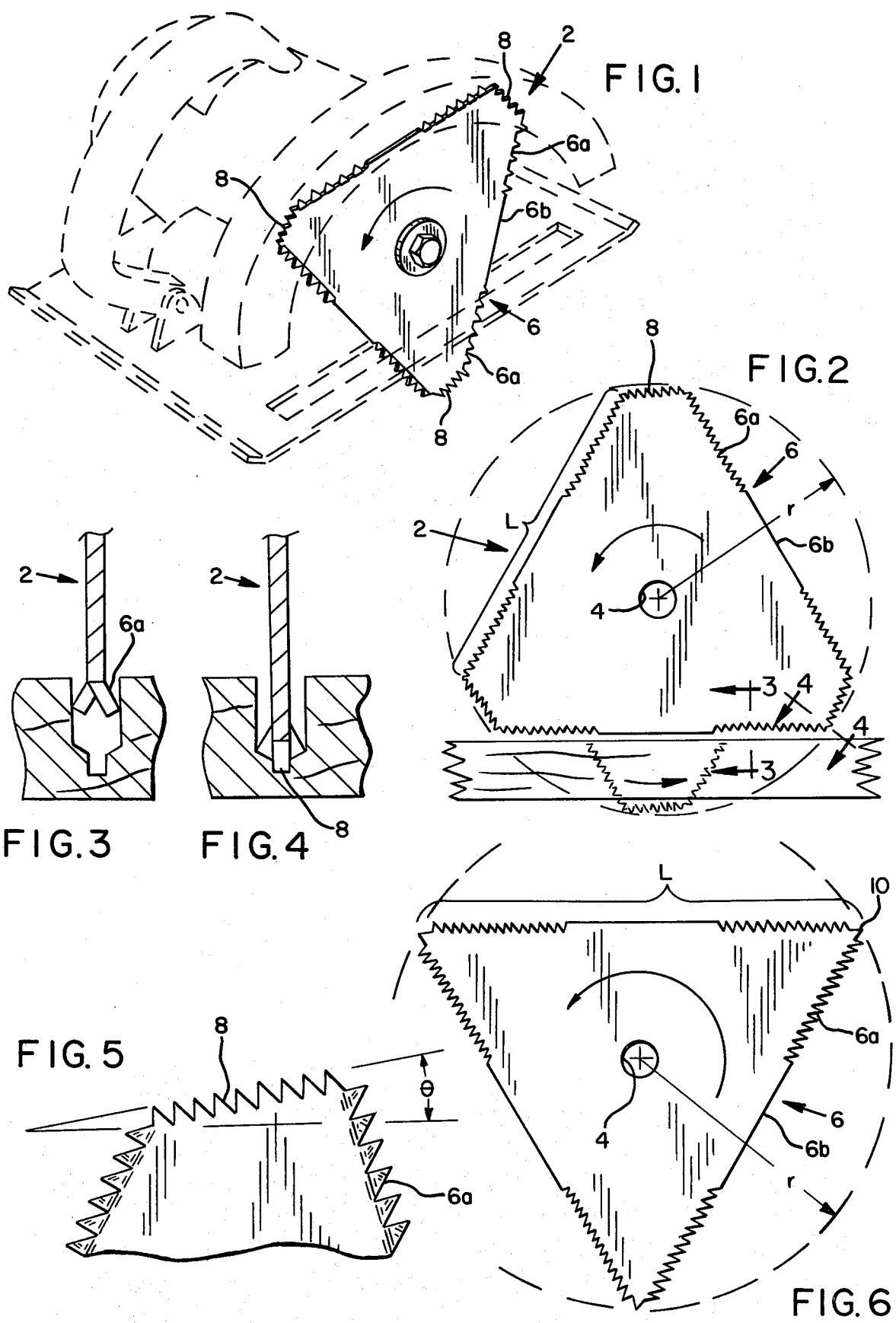

MULTI-DIRECTIONAL ROTARY SAW

CROSS-REFERENCE TO RELATED APPLICATION

This is a continuation-in-part of Ser. No. 954,651, filed Apr. 2, 1979 and now abandoned.

BACKGROUND OF THE INVENTION

The present invention relates to improvements in rotary saw blades, and specifically to improvements in multi-directional rotary saw blades, or those capable of cutting circles, curves, grooves, slots, radiuses and plunge cuts.

Conventional rotary saw blades of circular design are not suited for making arcuate, slotted or plunge-type cuts due to the fact that they cannot clear the workpiece and so provide sufficient relief to be maneuverable within the cut. Moreover, and specifically in connection with plunge-type cuts, such conventional blades tend to kick back and grab the material being cut, at times tending to "walk," or proceed without the control of the operator.

A number of multi-directional rotary saw blades addressing such problems encountered with conventional rotary blades are known. Gibb U.S. Pat. No. 2,239,317 discloses an elliptical saw capable of a variety of cuts by essentially chopping wood that is moved laterally or at right angles to the plane of the blade. Toki U.S. Pat. No. 3,712,349, discloses a rhomboidal blade with the teeth on the two cutting edges being arched in opposite directions. Although the Toki blade is capable of being used for multi-directional cutting, it tends to "slap" and kick back from the material, making for a rather rough, choppy and more dangerous cut. Gibb U.S. Pat. No. 3,831,484 discloses a multi-lobed blade having three or more lobes, the peripheral edge contour of which conforms to a portion of the circumference of a circle. Spaced between each lobe is an abreviated sector, the peripheral edge contour of which is parabolic. The primary drawback of such a blade with respect to multi-directional cutting is that it has a very limited depth of cut, that is, the depth of cut at which a portion of the blade can clear the material and so be sufficiently maneuverable to make arcuate and plunge cuts is relatively shallow. More specifically, the depth of cut at which a portion of the Gibb blade clears the material is substantially limited to the radial center line of the circular segment cut out of the circle by the abbreviated sectors. In a typical 7¼ inch diameter blade (the standard size in the marketplace) this depth is less than ½ inch.

What is needed thereof is a multi-directional rotary saw blade capable of clearing the workpiece an appropriate number of times per revolution to allow sufficient maneuverability to make arcuate, circular, slotted and plunge cuts, yet cut into the workpiece a sufficient number of times per revolution to be capable of a smooth, even cut and still make a sufficiently deep cut to be useful in commercial construction and home building projects.

SUMMARY OF THE INVENTION

The present invention satisfies the foregoing needs by the provision of a substantially equilateral triangular-shaped rotary blade with an axis of rotation centered therein. Such a blade entirely clears the workpiece three times per revolution, providing sufficient maneuverability to make any size or shape of a curved or plunge cut, yet, in a typical rotary power handsaw having a rotary speed of 5000 rpm, makes cutting contact 15000 times per minute, thus assuring a smooth, even cut. Moreover, the depth of cut while clearing the workpiece with the rotary blade of the present invention is considerably greater than, for example, that available with the blade disclosed in Gibb U.S. Pat. No. 3,831,484, the present invention's depth of cut being equal to approximately one-half the radius of the circle traced by the tips of the triangle. Each of the three peripheral edges of the triangular saw blade of the present invention preferably have set teeth. In a preferred embodiment, the middle portion of each of the three sides has no teeth, and in a still more preferred embodiment, each corner of the triangle is truncated at an angle of from about 0° to about 20° from the horizontal, preferably 8° to 12°, so as to provide a smoother cutting operation.

BRIEF DESCRIPTION OF THE DRAWINGS

FIG. 1 is a perspective view of the rotary saw of the present invention shown in operation on a conventional hand power saw, such as a Skil ® saw.

FIG. 2 is a plan view of a preferred embodiment of the present invention, cutting through the workpiece, showing a blade with no teeth in the middle portion of each of the three sides, set teeth in the remainder of each of the three sides, and truncated tips having unset teeth therein, the truncation being by a straight line at a slight angle from the horizontal.

FIG. 3 is a sectional view of the saw blade shown in FIG. 2 taken along the line 3—3.

FIG. 4 is another sectional view of the saw blade shown in FIG. 2 taken along the line 4—4.

FIG. 5 is a detailed plan view of the truncated tip of the embodiment shown in FIG. 2.

FIG. 6 is a plan view of another embodiment of the present invention, showing the tips of the triangle intact.

DETAILED DESCRIPTION OF THE INVENTION

In the preferred embodiment of the invention shown in FIGS. 1, 2 and 6, a substantially equilateral triangular-shaped rotary blade 2 is shown with an axis of rotation 4 centered therein with three substantially equal straight sides 6 having portions 6a preferably with set teeth and portions 6b preferably with no teeth. Each corner 8 of the triangle has been truncated on a straight line and at a slight angle from the horizontal so as to first present a low profile leading edge to the workpiece, the truncation being illustrated for a blade rotating in the counter-clockwise direction. The teeth at the truncated corners 8 are preferably not set, though they may be if so desired.

Another embodiment is shown in FIG. 6 wherein the tips 10 of the triangle are intact. The sides 6 of the equilateral triangle may have teeth along their entire edges (not shown), although they are not necessary. Preferably, all of the teeth are set.

So designed, the rotary blade of the present invention entirely clears the workpiece three times each revolution (best seen in FIG. 2), thus enabling its user to make curved, slotted, rounded and plunge cuts with ease, there being no gouging, jumping, pinching, grabbing or "walking" of the blade in the wood. While clearing the workpiece three times each revolution, the rotary blade of the present invention also cuts into the workpiece three times each revolution, the clearing and cutting action being shown in detail in FIGS. 3 and 4, respectively. As seen in FIG. 3, the unset teeth in the tip form the point of deepest penetration, thus creating a notch-shaped cut with a trough at the bottom thereof. In a typical power handsaw application having a rotary speed of 5000 rpm, the blade of the present invention both clears and cuts 15000 times per minute, making for a smooth, even cut even in the cutting of plunge-type cuts.

The depth of cut of the saw of the present invention is approximately equal to one-half the radius of the circle traced out by the tips of the triangle, seen in FIG. 6, and slightly less in the case of the truncated triangular-shaped blade shown in FIG. 2. In a typical 7¼ inch diameter blade application, as a practical matter this means that either blade shown in FIGS. 2 and 6 can cut through the thickness of a standard 2×4 while entirely clearing the same three times per revolution. This is in significant contrast to, for example, the prior art blade shown and described in Gibb U.S. Pat. No. 3,831,484, wherein the depth of cut when the blade clears the workpiece is substantially less than ½ inch.

Preferably, all of the teeth on the sides 6 of the blade of the present invention are set so as to cut slightly wider than the width of the blade, making for a smoother, more roomy cut. The teeth on the truncated corners 8 are preferably not set simply due to substantial savings realized in the cost of making the die for manufacture of the blade. Since no teeth are necessary in the middle portion 6b of the blade, preferably teeth are omitted from this portion and at the same time further savings are made in the cost of manufacture. The middle portion 6b may be equal to the difference between the entire length of one side (L) and twice the minimum lengths for the amount of teeth necessary to make the desired depth of cut. For example, if the depth of cut is desired to be at the maximum possible for the blade, or r/2 where r is the radius of the circle traced by the tip, the middle portion 6b can be defined by the expression L−(2×r/2) or L−r.

The truncation of the tips is best seen in the detail of FIG. 5 and is on a straight line at an angle $\theta$ of from about 0° to about 20° from the horizontal, preferably from about 8° to about 12°, the angle being subtended from the direction of blade rotation. As illustrated in FIGS. 2 and 5, the direction of rotation is counter-clockwise and so the angle $\theta$ is subtended from the counter-clockwise direction. The purpose of the slightly angular truncation is to first present a low profile leading edge of the blade to the workpiece, with a very gradual increase in cutting until the maximum depth of cut is reached. In this manner, the blade of the present invention cuts in a very smooth manner closely resembling that of an ordinary handsaw, which generally has its teeth set at an angle of about 9°.

The terms and expressions which have been employed in the foregoing specification are used therein as terms of description and not of limitation, and there is no intention of the use of such terms and expressions of excluding equivalents of the features shown and described or portions thereof, it being recognized that the scope of the invention is defined and limited only by the claims which follow.

What is claim is:

1. A multi-directional rotary saw blade comprising a planar substantially equilateral triangular shaped member having means therein for mounting said blade to a rotary drive source, said member having toothed truncated end portions defined by a straight line cut across each of the ends of said member; each of the three sides of said member having a plurality of saw teeth disposed thereon.

2. The saw blade of claim 1 wherein the truncation is at a slight angle from the horizontal.

3. The saw blade of claim 2 wherein the angle is from about 0° to about 20°.

4. The saw blade of claim 2 wherein the angle is from about 8° to about 12°.

5. The saw blade of claim 1 wherein there is a gap in the saw teeth in the middle portion of each of the three sides.

6. The saw blade of claims 1 or 5 wherein the saw teeth are set.

7. The saw blade of claims 1 or 5 wherein the saw teeth on each of the three sides are set and those on the truncated tips are unset.

* * * * *